Figure 8:
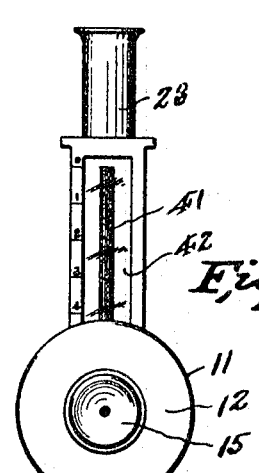

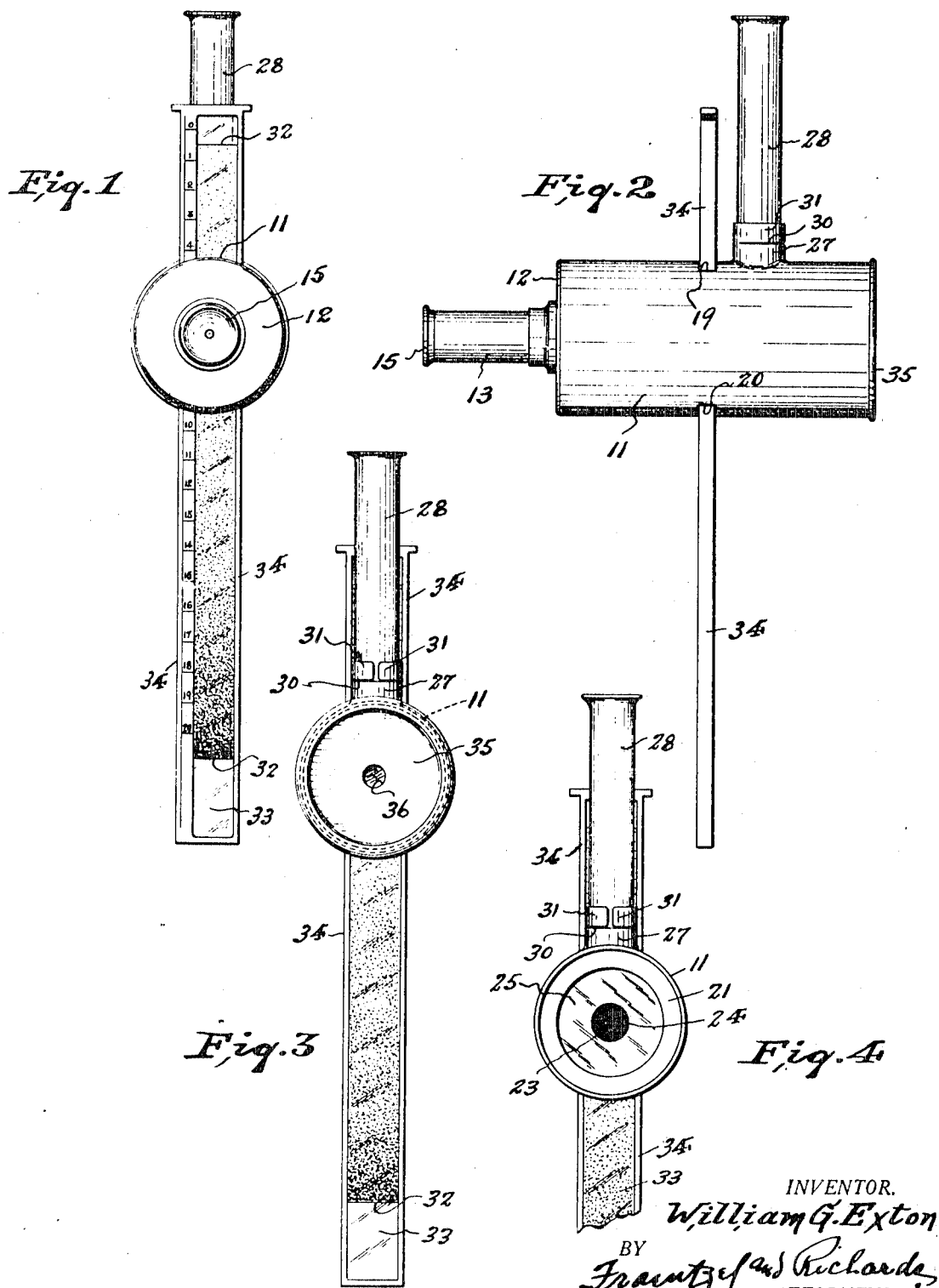

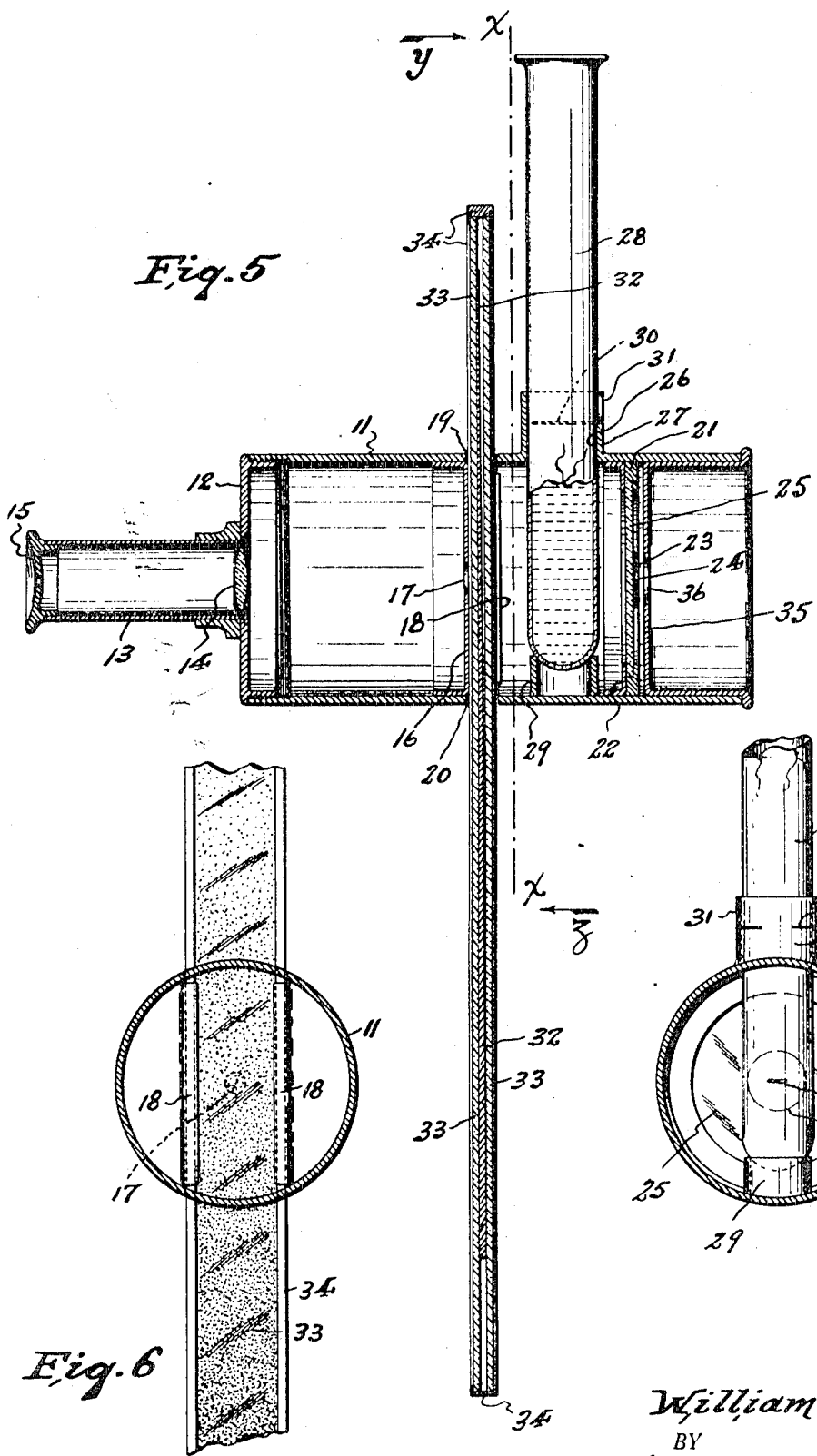

Oct. 4, 1927.  
W. G. EXTON  
1,644,331  
INSTRUMENT FOR MEASURING FLUIDS FOR TURBIDITY,  
COLOR, AND OTHER CHARACTERISTICS  
Filed Oct. 23, 1925  3 Sheets-Sheet 3

INVENTOR.
William G. Exton,
BY
Fraentzel and Richards,
ATTORNEYS.

Patented Oct. 4, 1927.

1,644,331

UNITED STATES PATENT OFFICE.

WILLIAM G. EXTON, OF NEW YORK, N. Y.

INSTRUMENT FOR MEASURING FLUIDS FOR TURBIDITY, COLOR, AND OTHER CHARACTERISTICS.

Application filed October 23, 1925. Serial No. 64,364.

This invention relates, generally, to an instrument for measuring turbidities, colors and other characteristics of fluids by optical observation.

Heretofore the principles underlying the structure and operation of measuring instruments for the purposes mentioned, have been based on what may be termed a comparison method, whereby a fluid of unknown turbidity, color, etc., is subjected to comparison with a fluid of known characteristics or with a prepared standard fluid; and in some cases, the unknown fluid is subjected to comparison with a prepared or standard wedge, by bringing the unknown fluid into a parallel visual field with the wedge, the latter being shifted until the unknown fluid matches some point on the wedge, the thickness of the wedge at the matching point furnishing the measurement by calibration. In order to provide an instrument for measuring the characteristics of fluids which is based on a method less complicated and more easily and rapidly practiced than the aforesaid "comparison" method, I have heretofore invented and have disclosed in my co-pending applications Ser. No. 570,459, filed June 23, 1922, and Ser. No. 644,602, filed June 11, 1923, instruments operating by a "disappearance method", wherein a target mark is viewed through a column of the unknown fluid to be measured, and the criterion of measurement is the determination of the depth of fluid at which the target mark disappears. In these instruments the measurement is determined by a fluid depth criterion. In my present invention, I have devised a very simple instrument which operates on a principle similar to that employed in my heretofore mentioned prior inventions, except that the measurement is determined by a wedge criterion instead of a fluid depth criterion; the wedge producing additive visual effects upon the fluid examined, when the latter and the wedge are together interposed between the eye and an illuminated target, to cause the disappearance of the target mark or absorption of color according to the specific character of the wedge; the thickness of wedge required to effect the disappearance of the target mark or absorption of color, as the case may be, furnishing the measurement by calibration.

My present invention, therefore, has for its principal object to provide an instrument of simple construction, comprising a casing having an eye-piece at one end, and having its opposite end open to the admission of light for the illumination of a suitable target mounted within the outer end portion of the casing. The casing is further provided with means to support a transparent fluid receptacle, such as a test tube, in front of said target, and interposed between the fluid receptacle and the eye-piece is an adjustable measuring wedge consisting of a suitably mounted body having a linear slope from end to end, said wedge being of progressively increasing density from one end toward the other to provide a gradually increasing degree of opacity progressing from an initial substantially transparent condition, or a gradually increasing intensity of color. The novel arrangement thus provided permits the target to be viewed through the interposed fluid to be measured and the wedge, and the latter being subject to manipulation and adjustment produces additive density sufficient to cause the disappearance of the target mark or absorption of color as the measuring condition or point readable on a scale arranged in connection with the wedge, and adapted to vary as the density of the latter varies.

Other objects of this invention, not at this time more particularly enumerated, will be clearly understood from the following detailed description of the same.

The invention is clearly illustrated in the accompanying drawings, in which:—

Figure 1 is a rear end elevation of my novel construction of instrument; Figure 2 is a side elevation of the same; Figure 3 is an outer end elevation of the same; Figure 4 is also an outer end elevation of the same, with the separable outer diaphragm thereof removed; Figure 5 is a longitudinal vertical section of my novel instrument, drawn on an enlarged scale; Figure 6 is a transverse section, taken on line X—X, looking in the direction of the arrow y; and Figure 7 is also a transverse section, taken on line X—X, looking in the direction of the arrow z.

Figure 10:
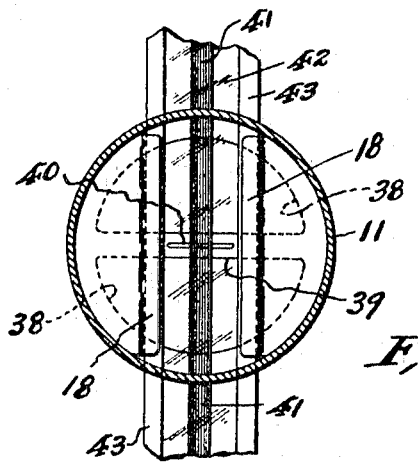
Figure 9:
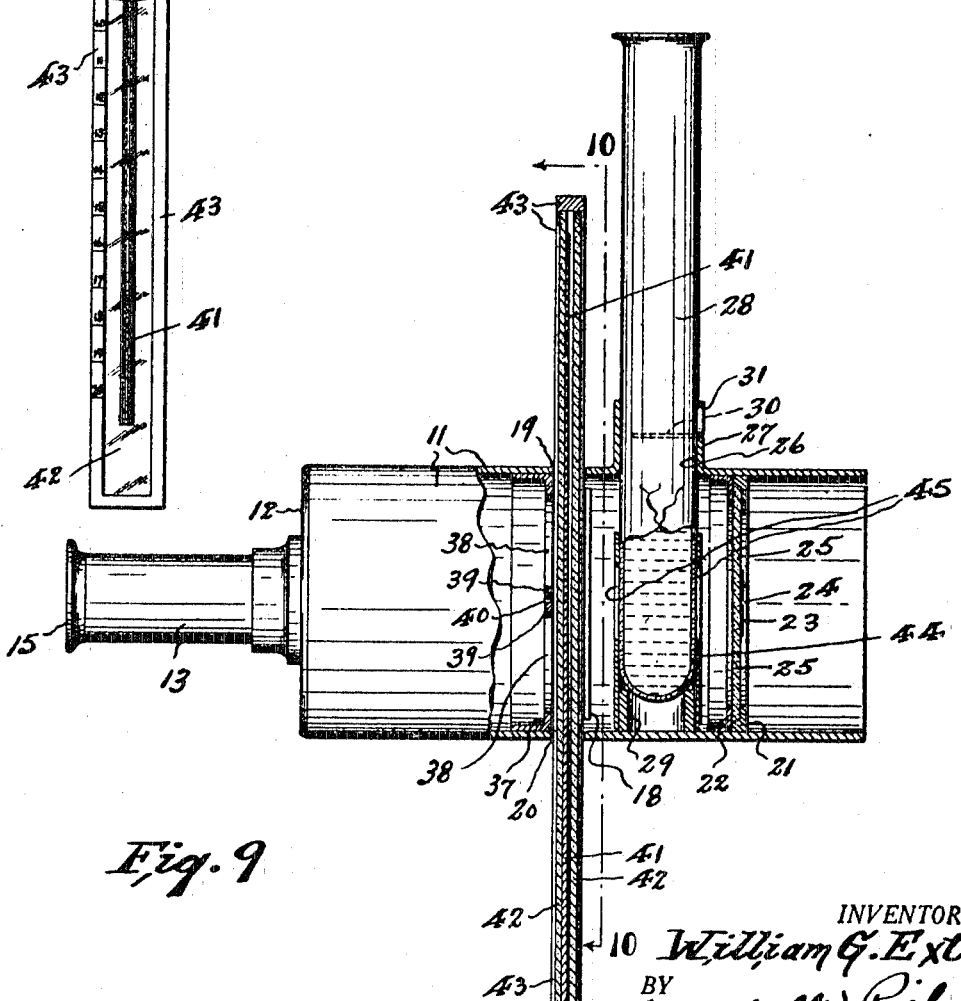

Figure 8 is a rear end elevation of my novel construction of instrument provided with a modified species of adjustable wedge and inner diaphragm adapted for practicing colorimetry, or measurement of fluids for color; Figure 9 is a longitudinal vertical section of my instrument with the modified species of color measuring wedge; Figure 10 is a transverse section, taken on line 10—10 in Figure 9.

Similar characters of reference are employed in all of the hereinabove described views, to indicate corresponding parts.

Referring now to said drawings, the reference character 11 indicates a longitudinal casing, preferably of cylindrical form, the same being closed at its rearward or inner end by a cap 12, which is threaded into or otherwise secured to the casing end. Centrally connected with said cap 12, so as to be axially alined with said casing 11 is an eye-piece, comprising a cylindrical barrel 13 of reduced diameter, provided at its forward inner end with a suitable lens 14, and at its outer or rearward free end with an apertured end member 15.

Fixed within the interior of said casing 11, to extend transversely across the same is a diaphragm 16 having a central opening 17 aligned with said eye-piece. Connected with the forward side of said fixed diaphragm 16 are a pair of laterally spaced vertical guide members 18 adapted to provide a measuring wedge slideway. The walls of said casing 11, above and below said slideway, are provided with openings 19 and 20 which are aligned with said measuring wedge slideway.

Adjustably movable through said slideway, provided by the guide members 18, and through said openings 19 and 20 is a measuring wedge. The said measuring wedge may be varied as to its specific character according to the particular characteristic of an unknown fluid it is desired to measure, as will be hereinafter more fully set forth.

Transversely disposed within the open outer end of said casing 11 is a target member. Said target member is supported by a keeper ring 21, which surrounds the marginal portions of the same, and holds the same in position against an internal annular seating ferrule 22. It will be understood, however, that any other desired form of target supporting means may be employed. The target member preferably comprises a transparent panel or disc, preferably made of glass, having a centrally disposed opaque target spot 23, which may be produced by silvering the central portion of the panel or disc, and within which spot 23 is produced a small transparent target mark 24. The marginal portion 25 of said panel or disc, which surrounds said opaque target spot 23 is transparent so as to permit the passage of light therethrough.

The upper wall of the casing 11, at a point intermediate the target member and the measuring wedge, is provided with an opening 26 surrounded by an upstanding annular flange 27, through which may be inserted a transparent receptacle 28, such as a test tube, adapted to contain the fluid to be measured. Connected with the underside wall of the casing 11, and within the interior of the latter, is a suitable seat member 29 to engage and support the receptacle 28, when the latter is inserted through the flanged opening 26. If desired, the said flange 27 may be partially cut through horizontally, as at 30, and its upper portion vertically divided to provide a pair of spring-like gripping jaws 31 for engaging and holding the receptacle 28 against accidental displacement from operative inserted relation to the casing 11.

When the receptacle 28, charged with the fluid to be measured, is inserted through said flanged opening 26 into the interior of said casing 11, the contained fluid will be interposed in the line of vision intermediate the target member and the measuring wedge.

When the instrument is to be used to measure a fluid for turbidity, the measuring wedge employed comprises a translucent body 32 possessing a linear slope from end to end, the same being treated to provide a progressively increasing degree of opacity extending onward from an initial substantially transparent condition at its thin end. A wedge having the described characteristics may be produced from a collodion material treated with a white pigment, the density of distribution of said white pigment in the collodion material progressively increasing from one end to the other to thereby attain the gradual increase of opacity desired. The wedge body 32 thus characterized and of suitable length is preferably mounted between two facing sheets of clear glass 33, to thereby both protect the same against surface scratches or other injury, while at the same time reenforcing the wedge body to obtain the rigidity necessary to convenient operative manipulations in connection with my novel measuring instrument. The assembled glass facing sheets and wedge body are preferably bound together by a binding frame 34 of suitable construction, and preferably made of metal. Provided in connection with the binding frame 34, or associated with the wedge body in any other convenient manner, is a suitably graduated scale to provide readings progressively corresponding to the increasing degrees of opacity of the measuring wedge body.

A fluid of unknown turbidity desired to be measured is introduced into the transparent container or receptacle 28, and then the latter is inserted into the casing 11 intermediate the target member and the measuring wedge. Turbidities of fluids are ordinarily classified as densities, clouds and hazes. If the fluid to be measured possesses a turbidity classified as a density, I insert in the outer open end of the casing 11, beyond the target member, a removable outer diaphragm 35 provided with an aperture 36 for alignment with the opaque target spot 23. This outer diaphragm tends to concentrate the light entering the outer end of the casing upon the target spot 23 so as to give sharp definition and brightness to the target mark 24. The measuring wedge is slid downwardly to bring its thin substantially transparent end in the field of vision. The operator now directs the open outer end of the casing 11 toward a bright light, and applies his eye to the eye-piece of the instrument.

The target mark 24 is sighted through the interposed measuring wedge and turbid fluid, and appears to the eye as a bright line or spot. The operator slowly slides upwardly the measuring wedge to interpose in the line of vision a gradually increasing opacity, which causes the target mark to gradually fade away and ultimately disappear. The scale of the measuring wedge is read when the point of movement of the latter is reached which produces the disappearance of the target mark. The resulting scale reading is compared with a table of predetermined and established standard readings, so that the amount of turbidity possessed by the fluid under examination is directly obtained by such reading and reference comparison.

If the fluid to be measured possesses a turbidity classified as a haze, I remove the outer diaphragm 35, thus permitting light to pass through the transparent zone 25 of the target member, to directly enter that portion of the interior of the casing in which the fluid is located, the inside walls of which may be treated with a suitable light reflecting coating, as e. g. a coating of white enamel. In this manner, the integrating effects of a hollow sphere principle of light scattering or reflections is obtained, whereby the very fine turbidity or haze is built up by multiple reflections from the suspended particles in the fluid to be measured, all in the manner adapted to produce the "dark field" effect familiar to microscopists. By this method the cloudiness or obstructing effect of the suspended particles is increased. The operator now applies his eye to the eye-piece and manipulates the measuring wedge until the target mark disappears, thereupon reading the wedge scale for comparison with a proper table of standard readings, whereby the measure of turbidity of the fluid examined may be readily determined.

If the fluid to be measured possesses a turbidity classified as a cloud, either the first or second method of examination above set forth may be utilized.

When the instrument is to be used to measure a fluid for color, I employ a modified form of measuring wedge together with a modified form of inner diaphragm. These modifications are illustrated in Figures 8 to 10 inclusive of the accompanying drawings. In place of the diaphragm 16, I employ an inner diaphragm 37 having a large central opening 38 across which is extended a diametrically disposed shield member 39 provided with a viewing slot or aperture 40. Connected with the outer face of said diaphragm 37 are the wedge slideway members or guides 18. The modified form of measuring wedge comprises a relatively narrow wedge body 41 to provide a color filter of a color complementary to the color of the fluid to be examined; e. g. if a blue fluid is to be examined and measured for color, the wedge body 41 will be made to provide the complementary color red. The wedge body 41 is made so that the color thereof gradually increases in intensity from one end to the other of said wedge body. The wedge body 41, thus characterized and of a suitable length, is mounted between two facing sheets of clear glass 42 of a width exceeding the width of the wedge so as to provide light admitting or transmitting sections at each side of said wedge body. The assembled glass facing sheets 42 and wedge body 41 are preferably bound together by a binding frame 43 of suitable construction and preferably made of metal. Provided in connection with the binding frame 43, or associated with the wedge body in any other convenient manner, is a suitably graduated scale to provide readings progressively corresponding to the increasing intensity of color of the measuring wedge body 41. The target member employed may be the same as that heretofore described.

A fluid of unknown color intensity desired to be measured is introduced into the transparent container or receptacle 28, and then inserted into the casing 11 intermediate the target member and the measuring wedge. When measuring color it is desirable to prevent the transmission of light through the fluid except at a point in the direct path of vision from eye-piece to target, so that the field or background upon which the color is shown is not influenced by the color of the fluid. To this end I enclose the lower end of the receptacle or container 28 in a sleeve 44 having diametrically opposed slots 45 for alignment in the path of vision between the eye-piece and target member. The measuring wedge is slid downwardly to bring its least intense complementary color portion in the field of vision. The operator now directs the open outer end of the casing 11 toward a bright light, and applies his eye to the eye-piece of the instrument. The light admitted through the target mark 24 passes through the slots 45 of the sleeve 44 to illuminate the fluid at the line of vision, so that the color effect is seen by the eye at the viewing slot or aperture 40 of the inner diaphragm 37. The light transmitted through the transparent zone 25 of the target member, is also transmitted through the clear glass sections of the measuring wedge member on each side of the wedge body 41, thus producing the effect of a white or light field against which the transmitted color is viewed. The operator slowly slides upwardly the measuring wedge to interpose in the line of vision a gradually increasing intensity of color complementary to the color of the fluid under examination, which gradually blots out or neutralizes the transmitted color and produces a total disappearance thereof, in other words produces the effect of blackness at the viewing slot or aperture 40 of the diaphragm 37. In order to aid the eye in determining the total absence of color or appearance of blackness thus effected, the shield member 39 excludes all light along the edges of the viewing slot or aperture 40, to produce a permanent black zone against which the blotting out effect of transmitted and neutralized color may be contrasted to assure the eye of total absence of color. The scale of the measuring wedge is read when the point of movement of the latter is reached which produces the disappearance of all color. The resulting scale reading is compared with a table of predetermined and established standard readings, so that the degree of color intensity of fluid under examination is directly obtained by such reading and reference comparison.

From the above description of my present invention it will be evident that I have produced a very simple and easily manipulated instrument by means of which measurements of turbidity, color, etc., of fluids may be quickly obtained.

I am aware that some changes may be made in the several arrangements and combinations of the various devices and parts making up my novel instrument, as well as in the details of the construction of the same, without departing from the scope of this invention as set forth in the foregoing specification, and as defined in the appended claims. Hence, I do not limit my invention to the exact arrangements and combinations of the various devices and parts as described in said specification, nor do I confine myself to the exact details of the construction of said parts as illustrated in the accompanying drawings.

I claim:—

1. An instrument of the kind described, comprising a casing having a closed end provided with an eye aperture, and having its opposite end open to the admission of light, a target member mounted within the open end of said casing, a measuring wedge transversely slidable through said casing intermediate said eye aperture and said target member, a transparent fluid receptacle, and means for supporting said receptacle within said casing intermediate said measuring wedge and said target member.

2. An instrument of the kind described, comprising a casing having an eye-piece at one end, and having its opposite end open to the admission of light, a target member mounted within the open end of said casing, an inner diaphragm having an aperture alined with said eye-piece located intermediate the latter and said target member, a measuring wedge slidable across the aperture of said inner diaphragm, a transparent fluid receptacle, and means for supporting said receptacle within said casing intermediate said measuring wedge and said target member.

3. An instrument of the kind described, comprising a casing having a closed end provided with an eye aperture, and having its opposite end open to the admission of light, a target member mounted within the open end of said casing, said target-member comprising a light transmitting body having an opaque central spot provided with a light transmitting target mark, a measuring wedge transversely slidable through said casing intermediate said eye aperture and said target member, a transparent fluid receptacle, and means for supporting said receptacle within said casing intermediate said measuring wedge and said target member.

4. An instrument of the kind described, comprising a casing having a closed end provided with an eye aperture, and having its opposite end open to the admission of light, a target member mounted within the open end of said casing, said target member comprising a light transmitting body having an opaque central spot provided with a light transmitting target mark, a measuring wedge transversely slidable through said casing intermediate said eye aperture and said target member, a transparent fluid receptacle, means for supporting said receptacle within said casing intermediate said measuring wedge and said target member, and a removable outer diaphragm having an aperture aligned with the opaque central spot of said target member.

5. An instrument of the kind described, comprising a casing having an eye-piece at one end, and having its opposite end open to the admission of light, a target member mounted within the open end of said casing, said target member comprising a light transmitting body having an opaque central spot provided with a light transmitting target mark, an inner diaphragm having an aperture alined with said eye-piece located intermediate the latter and said target member, a measuring wedge slidable across the aperture of said inner diaphragm, a transparent fluid receptacle, and means for supporting said receptacle within said casing intermediate said measuring wedge and said target member.

6. An instrument of the kind described, comprising a casing having an eye-piece at one end, and having its opposite end open to the admission of light, a target member mounted within the open end of said casing, said target member comprising a light transmitting body having an opaque central spot provided with a light transmitting target mark, an inner diaphragm having an aperture alined with said eye-piece located intermediate the latter and said target, a measuring wedge slidable across the aperture of said inner diaphragm, a transparent fluid receptacle, means for supporting said receptacle within said casing intermediate said measuring wedge and said target member, and a removable outer diaphragm having an aperture aligned with the opaque central spot of said target member.

7. An instrument of the kind described, comprising a casing having a closed end provided with an eye aperture, and having its opposite end open to the admission of light, a target member mounted within the open end of said casing, a measuring wedge transversely slidable through said casing intermediate said eye aperture and said target member, said measuring wedge being characterized by the possession of an increasing density from one end to the other, a transparent fluid receptacle, and means for supporting said receptacle within said casing intermediate said measuring wedge and said target member.

8. An instrument of the kind described, comprising a casing having an eye-piece at one end, and having its opposite end open to the admission of light, a target member mounted within the open end of said casing, said target member comprising a light transmitting body having an opaque central spot provided with a light transmitting target mark, an inner diaphragm having an aperture alined intermediate said eye-piece and said target mark of said target member, a measuring wedge slidable across the aperture of said inner diaphragm, said measuring wedge being characterized by the possession of an increasing density from one end to the other, a transparent fluid receptacle, and means for supporting said receptacle within said casing intermediate said measuring wedge and said target member.

9. An instrument of the kind described, comprising a casing having an eye-piece at one end, and having its opposite end open to the admission of light, a target member mounted within the open end of said casing, said target member comprising a light transmitting body having an opaque central spot provided with a light transmitting target mark, an inner diaphragm having an aperture alined intermediate said eye-piece and said target mark of said target member, a measuring wedge slidable across the aperture of said inner diaphragm, said measuring wedge being characterized by the possession of an increasing density from one end to the other, a transparent fluid receptacle, means for supporting said receptacle within said casing intermediate said measuring wedge and said target member, and a removable outer diaphragm having an aperture aligned with the opaque central spot of said target member.

10. An instrument of the kind described, a casing having an eye-piece at one end and a light transmitting target member at its opposite end, an inner diaphragm having an aperture aligned between said eye-piece and target member, a measuring wedge slidable across the aperture of said inner diaphragm, said wedge being characterized by the possession of a gradually increasing degree of opacity progressing from an initial substantially transparent condition, a fluid receptacle, and means for supporting said fluid receptacle intermediate said measuring wedge and said target member.

11. An instrument of the kind described, a casing having an eye-piece at one end and a light transmitting target member at its opposite end, an inner diaphragm having an aperture aligned between said eye-piece and target member, a measuring wedge slidable across the aperture of said inner diaphragm, said wedge being characterized by the possession of a gradually increasing degree of opacity progressing from an initial substantially transparent condition, a fluid receptacle, means for supporting said fluid receptacle intermediate said measuring wedge and said target member, and a removable outer diaphragm having an aperture aligned with the opaque central spot of said target member.

In testimony, that I claim the invention set forth above I have hereunto set my hand this 20th day of October, 1925.

WILLIAM G. EXTON.